(12) United States Patent
Park et al.

(10) Patent No.: US 10,898,978 B2
(45) Date of Patent: Jan. 26, 2021

(54) APPARATUS FOR SUPPLYING FASTENER FOR JOINING PANELS

(71) Applicants: HYUNDAI MOTOR COMPANY, Seoul (KR); KIA MOTORS CORPORATION, Seoul (KR)

(72) Inventors: Kwanghyo Park, Suwon-Si (KR); Taeyong Kwon, Suwon-Si (KR); Jae Hun Song, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 70 days.

(21) Appl. No.: 16/212,430

(22) Filed: Dec. 6, 2018

(65) Prior Publication Data

US 2019/0184505 A1   Jun. 20, 2019

(30) Foreign Application Priority Data

Dec. 20, 2017   (KR) ........................ 10-2017-0175709

(51) Int. Cl.
| | |
|---|---|
| *B23P 19/00* | (2006.01) |
| *B21J 15/32* | (2006.01) |
| *B21J 15/14* | (2006.01) |
| *F16B 5/04* | (2006.01) |

(52) U.S. Cl.
CPC ............. *B23P 19/004* (2013.01); *B21J 15/14* (2013.01); *B21J 15/32* (2013.01); *B23P 19/003* (2013.01); *F16B 5/04* (2013.01)

(58) Field of Classification Search
CPC ....... B23P 19/004; B23P 19/003; B21J 15/14; F16B 5/04
See application file for complete search history.

(56) References Cited

U.S. PATENT DOCUMENTS 5,558,248 A * 9/1996 Sakoda ................. B23P 19/002
221/164

* cited by examiner

*Primary Examiner* — Bayan Salone
(74) *Attorney, Agent, or Firm* — Morgan, Lewis & Bockius LLP (57) ABSTRACT

An apparatus for supplying a fastener for joining two different types of panels includes: a first bowl which accommodates fasteners of at least three specifications, aligns first fasteners of a first specification by a first guider, sequentially supplies the first fasteners to a supply unit through a first rail, and drops downward fasteners other than the first fasteners by a first dropping unit of the first guider; and a second bowl which is disposed at a lower side of the first bowl, accommodates the first fasteners dropped from the first bowl, aligns second fasteners of a second specification by a second guider, sequentially supplies the second fasteners to the supply unit through a second rail, and drops downward fasteners other than the second fasteners.

9 Claims, 7 Drawing Sheets

FIG. 1

--PRIOR ART--

FIG. 2

--PRIOR ART--

APPARATUS FOR SUPPLYING FASTENER FOR JOINING PANELS

CROSS-REFERENCE TO RELATED APPLICATION

This application claims priority to and the benefit of Korean Patent Application No. 10-2017-0175709 filed in the Korean Intellectual Property Office on Dec. 20, 2017, the entire contents of which are incorporated herein by reference.

TECHNICAL FIELD

The present disclosure relates to an apparatus for supplying a fastener for joining panels capable of sorting at least two types of steel fasteners and supplying the fasteners to a press-fitting device, thereby improving joint productivity of different types of panels.

BACKGROUND

To join a steel panel and an aluminum panel together, a steel element in the form of a rivet is press-fitted into the aluminum panel, and electricity is applied between the steel rivet and the steel panel, such that panels having different materials, i.e. a steel panel and aluminum panel, can be joined together by heat generated by resistance between the steel rivet and the steel panel.

A press-fitting device press-fits the steel rivets which are being continuously supplied into a predetermined position of the aluminum panel and joins the different types of materials through electrical resistance welding, and in this case, a supply unit for continuously supplying the steel rivets is required.

In general, the supply unit has a bowl which accommodates rivets having steel rivet, and a structure which applies vibration to the bowl to move the steel rivets accommodated in the bowl along a track formed in the bowl.

Such a vibration feeder refers to a proper-quantity automatic conveying device which conveys a predetermined quantity of small components (small components such as screws, bolts, and nuts) in the bowl to a desired location along a spiral track by applying vibration force, which is generated by a vibrator, to the bowl having the spiral track.

The vibrator is installed at a lower side of the vibration feeder, and the bowl having the spiral track, which is formed along an inner circumferential surface of the bowl, is installed at an upper side of the vibrator.

The spiral track has a spiral shape from a bottom of the bowl toward an opened upper side, such that the components accommodated at a center of the bowl are gradually conveyed to the upper side along the spiral track.

Since the vibration feeder aligns and supplies the components inputted into the single bowl, the vibration feeder cannot align and supply two types of components. Therefore, researches on a supply unit capable of allowing a vibration feeder to align and supply two or more types of components have been conducted.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide an apparatus for supplying a fastener for joining panels which can sort various types of fasteners comprising steel and supply the fasteners to a press-fitting device, thereby improving joint productivity of different types of panels and reducing facility costs.

An exemplary embodiment of the present disclosure provides apparatus for supplying a fastener for joining two panels of different types, the apparatus including: a first bowl which accommodates fasteners of at least three specifications, aligns first fasteners of a first specification by a first guider, sequentially supplies the first fasteners to a supply unit through a first rail, and drops downward fasteners other than the first fasteners by a first dropping unit of the first guider; and a second bowl which is disposed at a lower side of the first bowl, accommodates the first fasteners dropped from the first bowl, aligns second fasteners of a second specification by a second guider, sequentially supplies the second fasteners to the supply unit through a second rail, and drops downward fasteners other than the second fasteners.

The second bowl may drop downward fasteners other than the second fasteners by a second dropping unit of the second guider.

The apparatus may include a third bowl which is disposed at a lower side of the second bowl, accommodates the fasteners dropped from the second bowl, aligns third fasteners of a third specification by a third guider, and sequentially supplies the third fasteners to the supply unit through a third rail.

The specifications may be classified based on an outer diameter and a thickness of a head, and a length and an outer diameter of a foot connected to a central portion of one surface of the head.

The apparatus may further include the supply unit in which the first fasteners supplied from the first bowl and the second fasteners supplied from the second bowl are stacked and which distributes the fasteners to a press-fitting unit.

The supply unit may include: a first stacking jig in which the first fasteners are stacked; and a first supply jig which is disposed at a lower end of the first stacking jig so as to be movable forward and rearward, has an insertion hole into which the first fasteners are inserted by its own weight in a state in which the first supply jig is moved rearward, and is disposed to drop the first fasteners are into a feeding hose at a lower side of the first supply jig in a state in which the first supply jig is moved forward.

The supply unit may include: a second stacking jig in which the second fasteners are stacked; and a second supply jig which is disposed at a lower end of the second stacking jig so as to be movable forward and rearward, has an insertion hole into which the second fasteners are inserted by its own weight in a state in which the second supply jig is moved rearward, and is disposed to drop the second fasteners into the feeding hose in a state in which the second supply jig is moved forward.

The apparatus may include a controller which controls operations of the first supply jig and the second supply jig of the supply unit.

The first dropping unit may include: a first dropping guider on which a fastener of a specification, which is different from the first fasteners and has a foot having a length longer than a length of the foot of the first fasteners, climbs; and a first dropping stopper which pushes outward and drops the fasteners climbing on the first dropping guider.

The two panels may include an aluminum panel and a steel panel, the fasteners may penetrate the aluminum panel and is connected to the steel panel, and the fasteners may be welded on the steel panel by electrical resistance.

Another exemplary embodiment of the present disclosure provides apparatus for supplying a fastener for joining two different types of panel, the apparatus including: a first bowl which accommodates fasteners of at least three specifications, aligns first fasteners of a first specification by a first guider, sequentially supplies the first fasteners to a supply unit through a first rail, and drops downward fasteners other than the first fasteners by a first dropping unit of the first guider; a second bowl which is disposed at a lower side of the first bowl, accommodates the fasteners dropped from the first bowl, aligns second fasteners of a second specification by a second guider, sequentially supplies the second fasteners to the supply unit through a second rail, and drops downward fasteners other than the second fasteners by a second dropping unit of the second guider; and a third bowl which is disposed at a lower side of the second bowl, accommodates the fasteners dropped from the second bowl, aligns fasteners of a third specification by a third guider, and sequentially supplies the third fasteners to the supply unit through a third rail.

The apparatus may further include the supply unit in which the first fasteners supplied from the first bowl and the second fasteners supplied from the second bowl are stacked and which distributes the fasteners to a press-fitting unit.

The supply unit may include: a first stacking jig in which the first fasteners are stacked; and a first supply jig which is disposed at a lower end of the first stacking jig so as to be movable forward and rearward, has an insertion hole into which the first fasteners is inserted by its own weight in a state in which the first supply jig is moved rearward, and is disposed to drop the first fasteners into a feeding hose at a lower side of the first supply jig in a state in which the first supply jig is moved forward.

The supply unit may include: a second stacking jig in which the fasteners of the second specification are stacked; and a second supply jig which is disposed at a lower end of the second stacking jig so as to be movable forward and rearward, has an insertion hole into which the second fasteners is inserted by its own weight in a state in which the second supply jig is moved rearward, and is disposed to drop the second fasteners into the feeding hose in a state in which the second supply jig is moved forward.

The apparatus according to the exemplary embodiment of the present disclosure may sort various types of steel fasteners and selectively supply the steel fasteners to the press-fitting device, and as a result, it is possible to join different types of panels by using more various steel fasteners.

Therefore, it is possible to reduce costs for equipping the press-fitting device, increase production flexibility, and join various different types of panels.

DETAILED DESCRIPTION OF THE EMBODIMENTS

Hereinafter, an exemplary embodiment of the present disclosure will be described in detail with reference to the accompanying drawings.

The size and thickness of each component illustrated in the drawings are arbitrarily shown for understanding and ease of description, but the present disclosure is not limited thereto. Thicknesses of several portions and regions are enlarged for clearly describing the above.

A part irrelevant to the description will be omitted to clearly describe the exemplary embodiments of the present disclosure, and the same or similar constituent elements will be designated by the same reference numerals throughout the specification.

In the following description, names of constituent elements are classified as a first . . . , a second . . . , and the like so as to discriminate the constituent elements having the same name, and the names are not essentially limited to the order in the description below.

Figure 1:
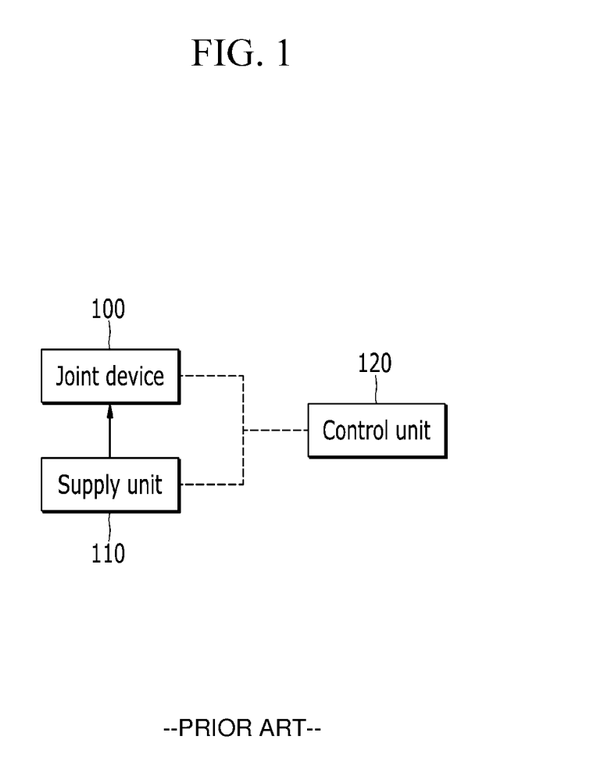
FIG. 1 is a configuration view of a joint system.

FIG. 1 is a configuration view of a general joint system.

Referring to FIG. 1, the general joint system includes a joint device 100, a supply device 110, and a controller 120.

The supply device 110 sequentially supplies steel fasteners to the joint device 100, and the joint device 100 joins different types of panels made of different fasteners.

In more detail, the panels to be joined include an aluminum panel and a steel panel, the fastener penetrates the aluminum panel and is connected to the steel panel, and the fastener is welded on the steel panel by electrical resistance applied from the joint device 100.

The controller 120 may be configured by one or more microprocessors operated by a predetermined program, and the predetermined program may include a series of commands for performing a method according to the exemplary embodiment of the present disclosure which will be described below. In addition, the controller 120 may be an electronic control unit (ECU).

Figure 2:
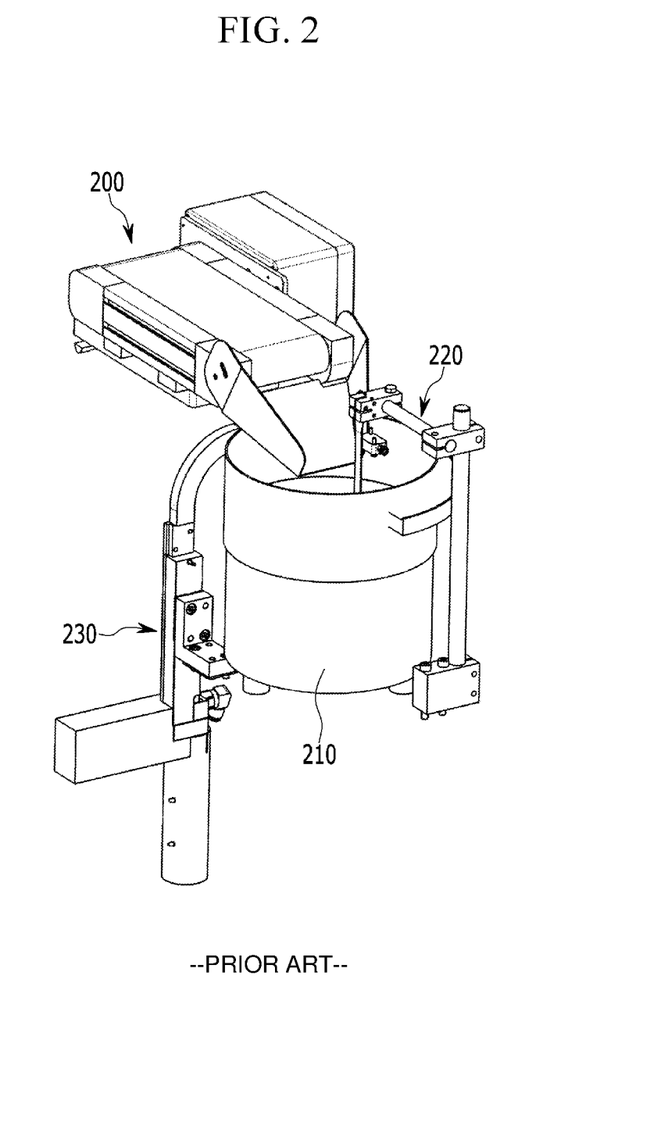
FIG. 2 is a perspective view of a fastener supply device.

FIG. 2 is a perspective view of a general supply device.

Referring to FIG. 2, the general supply device includes a conveyor 200 which can deliver steel fasteners, and a bowl 210 which accommodates the fasteners delivered by the conveyor 200. An alignment device 220, which aligns the delivered fasteners, is disposed in the bowl 210.

The fasteners aligned by the alignment device 220 are sequentially discharged along a rail, and the discharged fasteners are stacked in a supply device 230 that is similar to the supply device 110 of FIG. 1 and sequentially supplied to the joint device 100 of FIG. 1.

A vibration generator (not illustrated), which generates vibration, is disposed at a lower side of the bowl 210, and the vibration generator operates to sequentially supply the fasteners. An operational structure of the vibration generator is made by a publicly known technology, and a detailed description thereof will be omitted.

Figure 3:
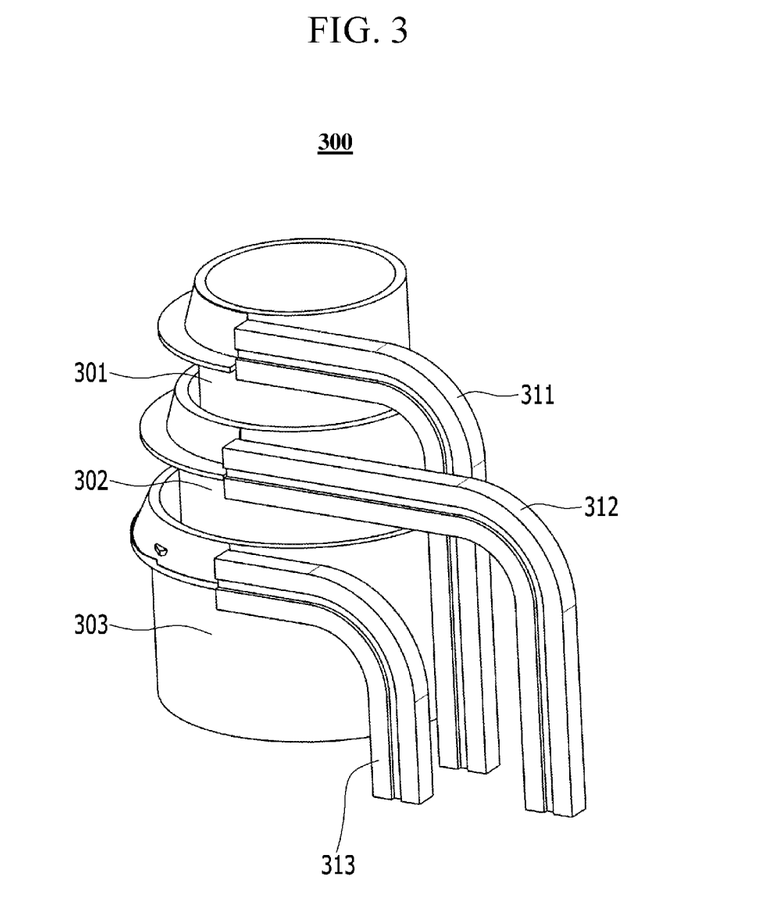
FIG. 3 is a perspective view illustrating an apparatus for supplying a fastener for joining panels according to an exemplary embodiment of the present disclosure.

FIG. 3 is a perspective view illustrating an apparatus for supplying a fastener for joining panels according to an exemplary embodiment of the present disclosure.

Referring to FIG. 3, an apparatus for supplying a fastener for joining panels 300 according to an exemplary embodiment of the present disclosure may include a first bowl 301, a second bowl 302, and a third bowl 303.

Figure 4:
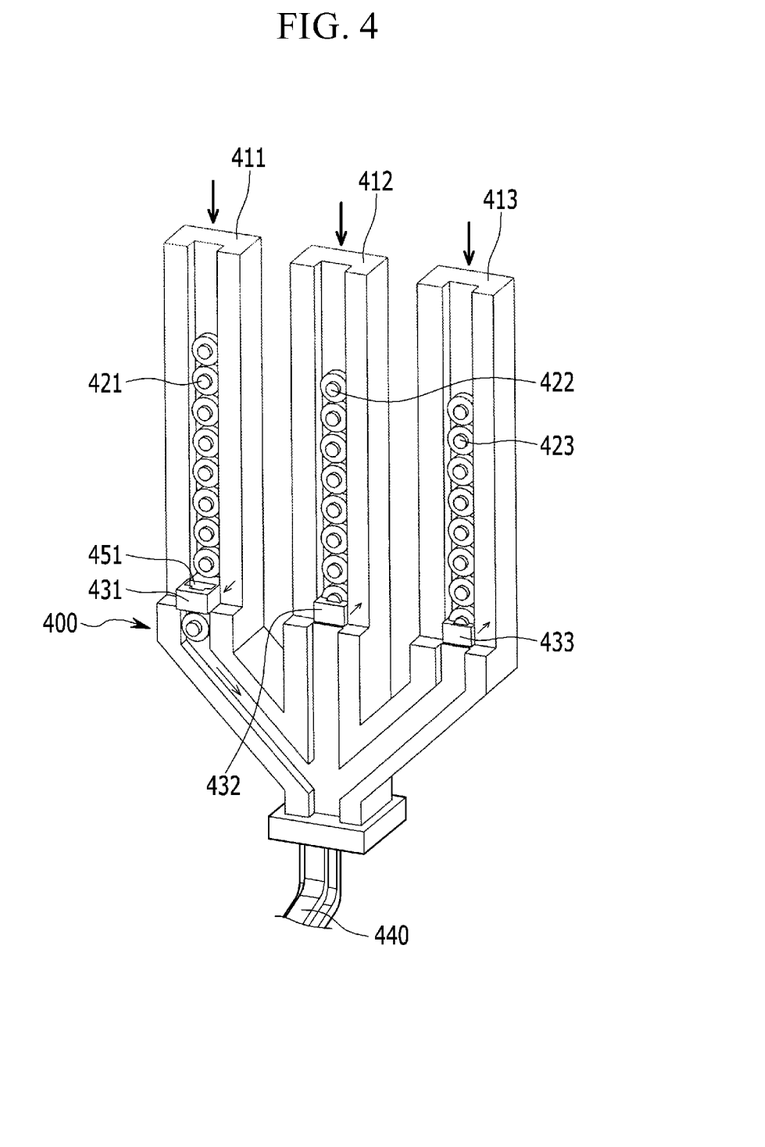
FIG. 4 is a partial perspective view of a supply unit according to an exemplary embodiment of the present disclosure.
Figure 5:
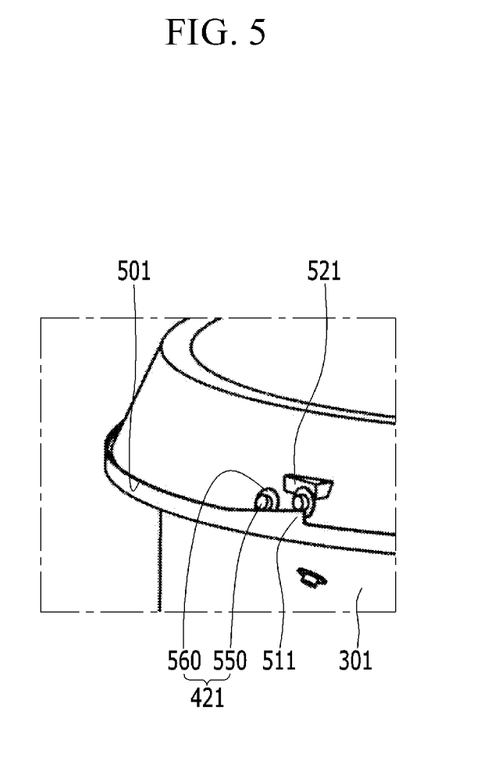
FIG. 5 is a partial perspective view of a first bowl of an apparatus for supplying a fastener for joining panels according to an exemplary embodiment of the present disclosure.

The first bowl 301 may accommodate fasteners of at least two specifications, align only fasteners of a first specification by a first guider 501 (FIG. 5), sequentially supplies the fasteners of the first specification to a supply unit 400 (FIG. 4) through a first rail 311, and then drops downward fasteners other than the fasteners of the first specification by a first dropping unit 511 and 521 formed on the first guider 501 (FIG. 5).

The second bowl 302 is disposed at a lower side of the first bowl 301, accommodates the fasteners dropped from the first bowl 301, aligns only fasteners of a second specification by a second guider, sequentially supplies the fasteners of the second specification to the supply unit 400 through a second rail 312, and then drops downward fasteners other than the fasteners of the second specification. The second bowl 302 may drop downward the fasteners other than the fasteners of the second specification by a second dropping unit having a similar configuration of the first dropping unit 511 and 521 on the second guider.

In addition, the third bowl 303 is disposed at a lower side of the second bowl 302, accommodates the fastener dropped from the second bowl 302, aligns only fasteners of a third specification by a third guider and then sequentially supplies the fasteners of the third specification to the supply unit through a third rail 313.

In the present disclosure, regarding the structures of the second and third guiders and the second and third dropping units, see the structures of the first guider 501 and the first dropping unit 511 and 521.

FIG. 5 is a partial perspective view of the first bowl of the apparatus for supplying a fastener for joining panels according to the exemplary embodiment of the present disclosure.

Referring to FIG. 5, the first guider 501 is configured on the first bowl 301, and the first dropping unit 511 and 521 is configured at one side of the first guider 501.

Since the structure of the first guider 501 and the structures of the second and third guiders are similar to one another, only the first guider 501 will be described. See the structure of the first guider 501 regarding the second and third guiders. Further, see the structures of the first dropping units 511 and 521 regarding the second and third dropping units.

The fasteners of the first specification are sequentially moved through the first guider 501, and the first dropping units 521 and 511 are configured at one side of the first guider 501. The first dropping unit includes a first dropping guider 511 and a first dropping stopper 521.

The first dropping guider 511 is formed at an upper side of the first glider 501 while having a predetermined inclination, and the first dropping stopper 521 protrudes from an outer surface of the first bowl 301.

A fastener 421 of the first specification has a foot 550 and a head 560. In a case in which a length of the foot 550 is relatively long, the fastener 421 moves upward along the first dropping guider 511 and is pushed outward by the first dropping stopper 521, and then the fastener 421 is dropped to the outside of the first bowl 301.

In the exemplary embodiment of the present disclosure, the specifications of the fasteners may be classified based on a length and an outer diameter of the foot, a thickness and an outer diameter of the head, and the like.

FIG. 4 is a partial perspective view of the supply unit according to the exemplary embodiment of the present disclosure.

Referring to FIG. 4, the supply unit 400 includes a first stacking rail 411, a second stacking rail 412, and a third stacking rail 413.

The first stacking rail 411 receives the fastener 421 of the first specification through the first rail 311 from the first bowl 301, the second stacking rail 412 receives a fastener 422 of the second specification through the second rail 312 from the second bowl 302, and the third stacking rail 413 receives a fastener 423 of the third specification through the third rail 313 from the third bowl 303.

A first supply jig 431 is disposed at a lower end portion of the first stacking rail 411, a second supply jig 432 is disposed at a lower end portion of the second stacking rail 412, and a third supply jig 433 is disposed at a lower end portion of the third stacking rail 413.

The first, second, and third supply jigs 431, 432, and 433 are disposed to be movable forward and rearward by actuators (not shown), respectively, and have insertion holes 451 into which the fasteners are inserted, and the insertion hole 451 is formed from an upper side to a lower side.

In a state in which the first supply jig 431 is moved rearward, the fastener 421 of the first specification is inserted into the insertion hole 451 of the first supply jig 431. When the first supply jig 431 is moved forward, the fastener inserted into the insertion hole 451 of the first supply jig 431 is dropped downward, and the dropped fastener is supplied to the joint device 100 through a feeding hose 440.

Likewise, the second and third supply jigs 432 and 433 may also supply the fasteners 422 and 423 of the second and third specifications to the joint device 100, respectively. Here, the controller 120 operates the first, second, and third supply jigs 431, 432, and 433 based on a control signal.

Figure 6:
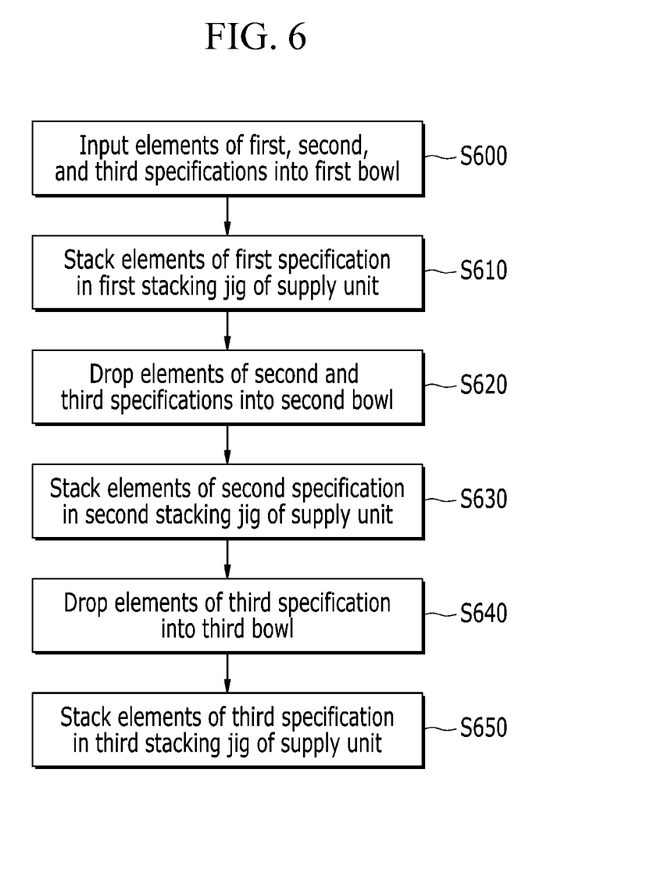
FIG. 6 is a view illustrating an operational sequence of an apparatus for supplying a fastener for joining panels according to an exemplary embodiment of the present disclosure.

FIG. 6 is a view illustrating an operational sequence of the apparatus for supplying a fastener for joining panels according to an exemplary embodiment of the present disclosure.

Referring to FIG. 6, in S600, the conveyor 200 inputs the fasteners 421, 422, and 423 of the first, second, and third specifications into the first bowl 301.

In S610, the fasteners 421 of the first specification are stacked in the first stacking jig 411 of the supply unit 400. Further, in S620, the fasteners 422 and 423 of the second and third specifications are dropped into the second bowl 302.

In S630, the fasteners 422 of the second specification are stacked in the second stacking jig 412 of the supply unit 400. Further, in S640, the fastener 423 of the third specification is dropped into the third bowl 303. In addition, in S650, the fasteners 423 of the third specification are stacked in the third stacking jig 413 of the supply unit 400.

Figure 7:
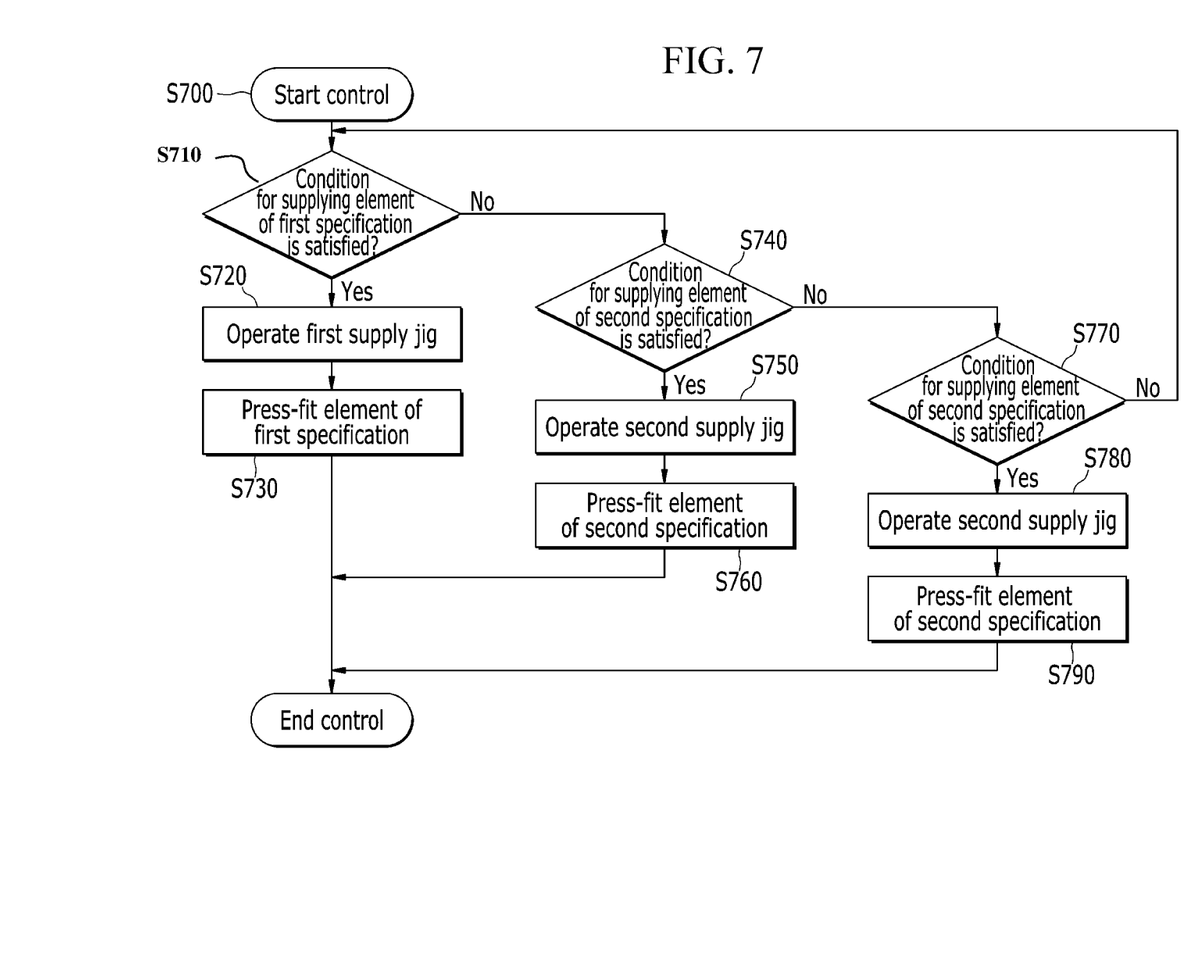
FIG. 7 is a flow chart illustrating an operating method of an apparatus for supplying a fastener for joining panels according to an exemplary embodiment of the present disclosure.

FIG. 7 is a flow chart illustrating an operating method of the apparatus for supplying a fastener for joining panels according to an exemplary embodiment of the present disclosure.

Referring to FIG. 7, in S700, the controller starts a control operation.

In S710, the controller 120 determines whether a condition for supplying the fastener 421 of the first specification is satisfied. When it is determined in S710 that the condition is satisfied, the first supply jig 431 operates in S720. Then, in S730, the joint device 100 press-fits the fastener 421 of the first specification into panels and joins the panels by applying electric power.

If it is determined in S710 that the condition is not satisfied, S740 is performed, in which the controller 120 determines whether a condition for supplying the fastener 422 of the second specification is satisfied.

When it is determined in S740 that the condition is satisfied, the second supply jig 432 operates in S750. Further, in S760, the joint device 100 press-fits the fastener 422 of the second specification into panels and joins the panels by applying electric power.

If it is determined in S740 that the condition is not satisfied, S770 is performed, and in S770, the controller 120 determines whether a condition for supplying the fastener 423 of the third specification is satisfied. When it is determined in S770 that the condition is satisfied, the third supply jig 433 operates in S780. Further, in S790, the joint device 100 press-fits the fastener 432 of the third specification into panels and joins the panels by applying electric power.

If it is determined S770 that the condition is not satisfied, S710 is performed again. When the panels are completely joined, the controller 120 ends the control operation in S795.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus for supplying a fastener for joining two different types of panels, the apparatus comprising:
    a first bowl configured to accommodate fasteners of at least two specifications, the first bowl configured such that first fasteners of a first specification among the fasteners of at least two specifications are aligned by a first guider, the first fasteners are sequentially supplied to a supply unit through a first rail, and fasteners other than the first fasteners among the fasteners of at least two specifications are dropped downward by a first dropping unit of the first guider; and
    a second bowl arranged at a lower side of the first bowl and configured to accommodate the first fasteners dropped from the first bowl, the second bowl configured such that second fasteners of a second specification are aligned by a second guider, the second fasteners are sequentially supplied to the supply unit through a second rail, and fasteners other than the second fasteners among the fasteners of at least two specifications are dropped downward,
    wherein the first dropping unit includes:
        a first dropping guider on which a fastener, which is different from the first fasteners and has a foot having a length longer than a length of a foot of each of the first fasteners, climbs; and
        a first dropping stopper which pushes outward and drops the fastener climbing on the first dropping guider,
    wherein the first dropping guider protrudes on an upper side of the first glider at a predetermined inclination, and
    wherein the first dropping stopper protrudes from an outer surface of the first bowl.

2. The apparatus of claim 1, wherein the second bowl is configured in a way that the fasteners other than the second fasteners are dropped downward by a second dropping unit of the second guider.

3. The apparatus of claim 2, comprising a third bowl arranged at a lower side of the second bowl and configured to accommodate the fasteners dropped from the second bowl, such that third fasteners of a third specification are aligned by a third guider and the third fasteners are sequentially supplied to the supply unit through a third rail.

4. The apparatus of claim 3, wherein each of the fasteners of at least three specifications has a head and a foot such that the at least three specifications are classified based on an outer diameter and a thickness of a head of each of the fasteners and a length and an outer diameter of a foot of each of the fasteners connected to a central portion of one surface of the head.

5. The apparatus of claim 3, wherein the first fasteners supplied from the first bowl and the second fasteners supplied from the second bowl are stacked in the supply unit.

6. The apparatus of claim 5, wherein the supply unit includes:
    a first stacking jig in which the first fasteners are stacked; and
    a first supply jig which is disposed at a lower end of the first stacking jig to be movable forward and rearward, has an insertion hole through which the first fasteners pass by gravity in a state in which the first supply jig is moved rearward, and is disposed to drop the inserted first fasteners into a feeding hose at a lower side of the first supply jig in a state in which the first supply jig is moved forward.

7. The apparatus of claim 6, wherein the supply unit further includes:
    a second stacking jig in which the second fasteners are stacked; and
    a second supply jig which is disposed at a lower end of the second stacking jig to be movable forward and rearward, has an insertion hole through which the second fasteners pass by gravity in a state in which the second supply jig is moved rearward, and is disposed to drop the second fasteners into the feeding hose in a state in which the second supply jig is moved forward.

8. The apparatus of claim 7, further comprising: a controller which controls operations of the first supply jig and the second supply jig.

9. The apparatus of claim 1, wherein the two different types of panels include an aluminum panel and a steel panel,
    wherein each of the fasteners extends through the aluminum panel and is connected to the steel panel, and each of the fasteners is combined with the steel panel.

\* \* \* \* \*